No. 833,616. PATENTED OCT. 16, 1906.
M. MONDRAGON.
HYDRAULIC PISTON BRAKE MECHANISM FOR CANNON.
APPLICATION FILED JAN. 21, 1904. RENEWED MAY 17, 1906.

Witnesses:
Inventor:
M. Mondragon,

UNITED STATES PATENT OFFICE.

MANUEL MONDRAGON, OF COURBEVOIE, FRANCE.

HYDRAULIC PISTON-BRAKE MECHANISM FOR CANNON.

No. 833,616.  Specification of Letters Patent.  Patented Oct. 16, 1906.

Application filed January 21, 1904. Renewed May 17, 1906. Serial No. 317,345.

*To all whom it may concern:*

Be it known that I, MANUEL MONDRAGON, a citizen of the Mexican Republic, residing at 205 Rue de Becon, Courbevoie, Seine, France, have invented certain new and useful Improvements in Hydraulic Piston-Brake Mechanisms for Cannon, of which the following is a specification.

The present invention consists of a hydraulic piston-brake mechanism of the type known as "loaded valve," which maintains a continuous resistance and is arranged for instant regulation. It is also self-acting—that is, always ready for use without any previous preparation. This mechanism may be constructed in the manner described, by way of example, in the annexed drawings.

Figure 1:
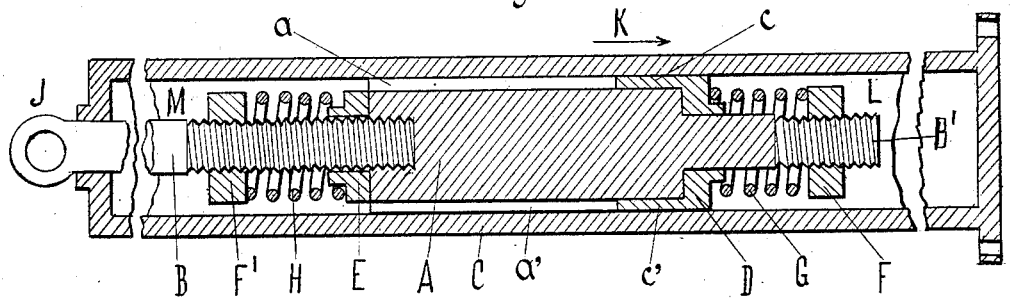
Figure 2:
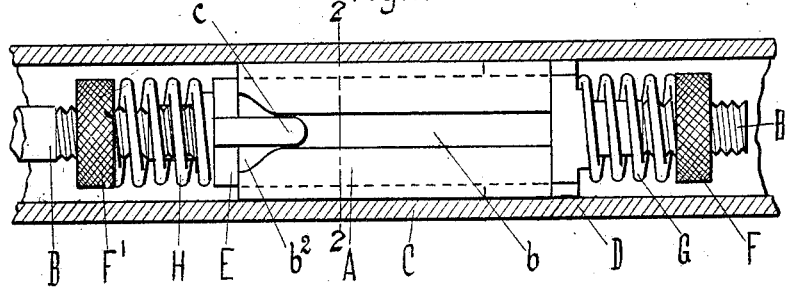
Figure 3:
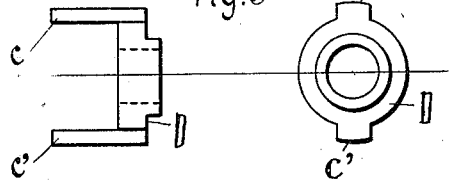
Figure 4:
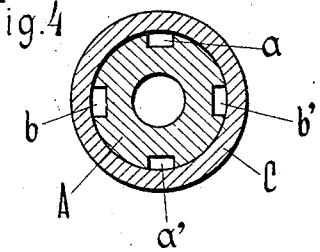
Figure 5:
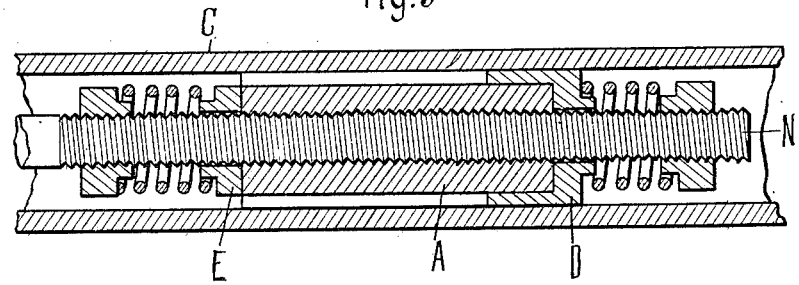

Figure 1 represents a longitudinal section of my improved hydraulic-brake mechanism through the axis of the recoil-grooves. Fig. 2 is an exterior view of the piston with the cylinder of the brake in section. Fig. 3 represents the side and end views of the valve. Fig. 4 is a cross-section through line 2 2 of Fig. 2, and Fig. 5 is a modified form of the brake mechanism.

In constructing my invention I provide a cylindrical piston A, the diameter of which is equal to the interior diameter of the cylinder C and sliding loosely within the latter. At one end of the piston is a reduced stem B, partly threaded, which in practice projects from the cylinder and has means for attaching same to the gun-mount, and at its opposite end is a short projecting stem B', threaded at its end. This piston has four longitudinal grooves, equidistant from each other, the two opposite grooves $a\ a$, being herein designated as "recoil-grooves" and the other intermediate grooves as "counter-recoil grooves." These grooves are rectangular in cross-section, the grooves $a\ a'$ at one end of the piston having a wide opening and the other grooves $b\ b'$ having similar wide openings, as $b^2$, at the other end of the piston, for reasons which will hereinafter be set forth.

A valve is provided at each end of the piston, of which D is designated as the "recoil valve" and E the "counter-recoil" valve. These valves have each a disk body with a central aperture, so they will slide freely along the stems B B', and each disk is also provided with parallel beaks or arms C C', oppositely disposed, of substantially the same shape as the grooves in the piston, these beaks lying within the grooves so that when the valve is seated against the piston the ends of the beaks will project beyond the point where the groove begins to widen out.

The stem B' has thereon a coiled spring G, resting against the recoil-valve D, and a nut F on this threaded stem rests against the spring, so as to afford adjustment. At the opposite end of the piston a similar coiled spring H rests against the counter-recoil valve E, and a nut on the threaded stem B rests against the spring, so as to provide adjustment or tension against this valve.

In practice the piston A may be connected with the recoiling body by the rod or stem B—that is, it may recoil therewith or, as in the present case, it may remain fixed, the displacement of liquid being effected by the movement of the brake-cylinder C, which is directly connected, as at I, with the moving mass, while the piston is connected by its rod B with a fixed part of the carriage, as at J.

The operation of the invention is as follows: When the cannon recoils, the brake-cylinder C is carried, along with the movement, in the direction indicated by the arrow K, and as the piston A is fixed the liquid contained in the cylinder is compressed on the forward face of the valve E, the compression taking place within the space indicated by M. The liquid is also by this recoil motion driven back into the recoil-grooves $a\ a'$. The force of the recoil thus transmitted by the liquid overcomes the resistance of the valve D, which it moves rearward by compressing the spring G, and the liquid then, or a portion, passes to the other side of the piston. When the valve is unseated and recedes from the piston, the ends of the beaks C C' are withdrawn sufficiently from the grooves $a\ a'$ to permit the liquid to flow readily through the widened mouths or openings of the grooves at the end of the piston, and as the recoil force decreases the spring tends to return the valve to its normal position, which movement is accomplished gradually, since the beaks in moving inwardly slowly reduce the size of the escape-holes by the contracting areas of the flaring mouths of the grooves. When the recoil is finished, the cylinder-brake is drawn in the opposite direction by the recuperator, the liquid is compressed on the rear side of the piston, (within the space indicated by L,) and it then penetrates the counter-recoil grooves $b\ b'$, and the force of the recuperator, transmitted by the liquid, overcomes the resistance of the valve E, which it moves forward by compressing the spring H. In a manner similar to the action of the recoil as the force diminishes the valve closes by the action of the spring and progressively reduces the escape-holes. By this mechanism the length of the recoil or the rapidity of the counter-recoil may be modified by varying the force of the springs by the nuts F F'. It can also be applied to cannon of any caliber by modifying the diameter of the piston and the dimensions of the escape-holes.

In Fig. 5 I show a modified structural form in which the piston A, together with the nuts and valves, is supported by a threaded rod N; but in other respects the structure is the same.

What I claim as new is—

1. A hydraulic-brake mechanism comprising a liquid-containing cylinder one end of which is secured to a recoiling body, a piston therein having a projecting rod attached to a fixed body, said piston having at each end a valve and an adjustable spring and escape-holes for the liquid.

2. A hydraulic-brake mechanism comprising a liquid-containing cylinder, having a piston-rod projecting from one end, one end of the cylinder and said rod being respectively attached to a recoiling and a fixed body, a piston having four equidistant longitudinal grooves, two of the opposite grooves having at one end wide mouths, and the other intermediate grooves having similar wide mouths at the opposite end of the piston, and a valve on each end of the piston, one provided with beaks which rest in one pair of opposite grooves, and the other having beaks resting in the other pair of grooves, and springs for holding the valves normally against the piston.

3. A hydraulic-brake mechanism, comprising a liquid-containing cylinder, having a piston and a rod projecting therefrom at one end, the end of the cylinder and the projecting end of said rod being respectively attached to a recoil and a fixed body, a valve seated against each end of the piston and held in contact therewith by an adjustable spring, four equidistant longitudinal grooves along said piston, each valve having means coöperating with said grooves for gradually reducing the discharge-openings of said grooves as the valve regains its normal position, one valve having means coöperating with two of said grooves, and the other valve having means coöperating with the other pair.

4. In a hydraulic-brake mechanism, the combination of a liquid-containing cylinder, having means for attaching same to a recoiling body, a piston therein having a projecting rod for attaching to a fixed object, grooves or ducts from one end of said piston to the other one, a valve having means coöperating with two of said grooves, another valve having means coöperating with the other pair of grooves, for gradually reducing the discharge areas of said grooves during the return movement of said valves, and adjustable springs seated against said valves for regulating the resistance or length of recoil, as set forth.

In testimony whereof I have affixed my signature in presence of two witnesses.

MANUEL MONDRAGON.

Witnesses:
LOUIS FERRIE,
ALBERTO ALVAREZ.